United States Patent
Garner

(10) Patent No.: US 9,695,881 B1
(45) Date of Patent: Jul. 4, 2017

(54) U-JOINT SEAL

(71) Applicant: Freudenberg-NOK General Partnership, Plymouth, MI (US)

(72) Inventor: David Garner, Indianapolis, IN (US)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 0 days.

(21) Appl. No.: 15/195,327

(22) Filed: Jun. 28, 2016

(51) Int. Cl.
| | |
|---|---|
| *F16C 33/78* | (2006.01) |
| *F16D 3/38* | (2006.01) |
| *F16D 3/84* | (2006.01) |
| *F16J 15/32* | (2016.01) |
| *F16J 15/3232* | (2016.01) |
| *F16J 15/3216* | (2016.01) |

(52) U.S. Cl.
CPC .......... *F16D 3/385* (2013.01); *F16C 33/7823* (2013.01); *F16D 3/845* (2013.01); *F16J 15/3216* (2013.01); *F16J 15/3232* (2013.01)

(58) Field of Classification Search
CPC .............. F16C 33/7809; F16C 33/7823; F16C 33/7826; F16C 33/7876; F16D 3/385; F16D 3/845; F16D 3/848; F16D 2003/846; F16D 2300/08; F16J 15/3216; F16J 15/3232
USPC ...................... 464/11–13, 128, 130, 131, 178
See application file for complete search history.

(56) References Cited

U.S. PATENT DOCUMENTS

| | | | |
|---|---|---|---|
| 4,515,574 A | 5/1985 | Mazziotti | |
| 4,664,643 A | 5/1987 | Cusati | |
| 5,597,356 A * | 1/1997 | Rieder | F16C 33/7876 464/131 |
| 5,769,723 A * | 6/1998 | Faulbecker | F16C 33/7809 464/131 |
| 6,059,663 A | 5/2000 | Jones et al. | |
| 6,601,855 B1 | 8/2003 | Clark | |
| 7,201,663 B2 * | 4/2007 | Menosky | F16C 33/7809 464/133 |
| 8,142,292 B2 | 3/2012 | Ledford et al. | |

FOREIGN PATENT DOCUMENTS

| | | | | |
|---|---|---|---|---|
| DE | 4128179 A1 * | 2/1993 | .......... | F16C 33/7809 |
| EP | 2921734 A1 * | 9/2015 | .......... | F16C 33/7809 |
| FR | 2984978 A1 * | 6/2013 | .......... | F16C 33/7876 |

* cited by examiner

*Primary Examiner* — Josh Skroupa
(74) *Attorney, Agent, or Firm* — Daniel J. Sepanik, Esq.; Harness, Dickey & Pierce, P.L.C.

(57) ABSTRACT

A universal joint includes a trunnion including an annular recess in an outer surface. A bearing cup is disposed on the trunnion and includes an inner diameter surface having a retention recess therein. A needle bearing assembly is disposed between an outer surface of the trunnion and the inner diameter surface of the bearing cup. A seal assembly is disposed at an open end of the bearing cup and includes a seal support insert including a radially outwardly protruding retention member engaged with the retention recess of the bearing cup. An elastomeric seal is molded to the seal support insert and includes a plurality of radially inwardly extending seal lips engaging the outer surface of the trunnion and a dust lip extending axially from the seal support insert and including a dust lip retention feature received in an annular recess of the trunnion.

9 Claims, 2 Drawing Sheets

U-JOINT SEAL

FIELD

The present disclosure relates to a u-joint and more particularly to a seal for sealing between a trunnion and a bearing cap of a u-joint.

BACKGROUND AND SUMMARY

This section provides background information related to the present disclosure which is not necessarily prior art.

Universal joints are structures which are well known in the art. Such joints usually include a cross member having a central body portion with four trunnions extending outwardly therefrom. The trunnions extend at right angles relative to one another and lie in a single plane. A central bore is provided in each trunnion forming an opening in the end of the trunnion opposite the central body portion. A hollow cylindrical bearing cup, closed at one end, is disposed over the open end of each of the trunnions. Roller bearings are provided between each of the bearing cups and its associated trunnion such that the bearing cups are rotatably mounted thereon.

During assembly, lubricant can be placed in the central bore in each trunnion. During operation of the universal joint, centrifugal forces move the lubricant outwardly from the trunnion bore towards the closed ends of the bearing cups. The lubricant passes around the outer ends of the trunnions adjacent the closed ends of the bearing cups and radially inwardly back between the bearing cups and the trunnions where the roller bearings are disposed. In this manner, the roller bearings are lubricated for use.

It is known to provide the open ends of the bearing cups with elastomeric seals. The elastomeric seal is typically positioned between the trunnion and bearing cup to form a seal therebetween. To provide an effective seal, such seals must resist the entry of contaminants into the bearing cup and restrict the flow of lubricant out of the region of the bearing cup where the roller bearings are located. The assembly of the seal in proper alignment between bearing cup and the trunnion can be challenging.

Accordingly, the present disclosure provides a universal joint that includes a trunnion including an annular recess therein. A bearing cup is disposed on the trunnion and includes an inner diameter surface having a retention recess therein. A needle bearing assembly is disposed between an outer surface of the trunnion and the inner diameter surface of the bearing cup. A seal assembly is disposed at an open end of the bearing cup and includes a seal support insert including a radially outwardly protruding retention member engaged with the retention recess of the bearing cup. An elastomeric seal is engaged with the seal support insert and includes a plurality of radially inwardly extending seal lips engaging the outer surface of the trunnion and a dust lip extending axially from the seal support insert and including a dust lip retention feature received in an annular recess of the trunnion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
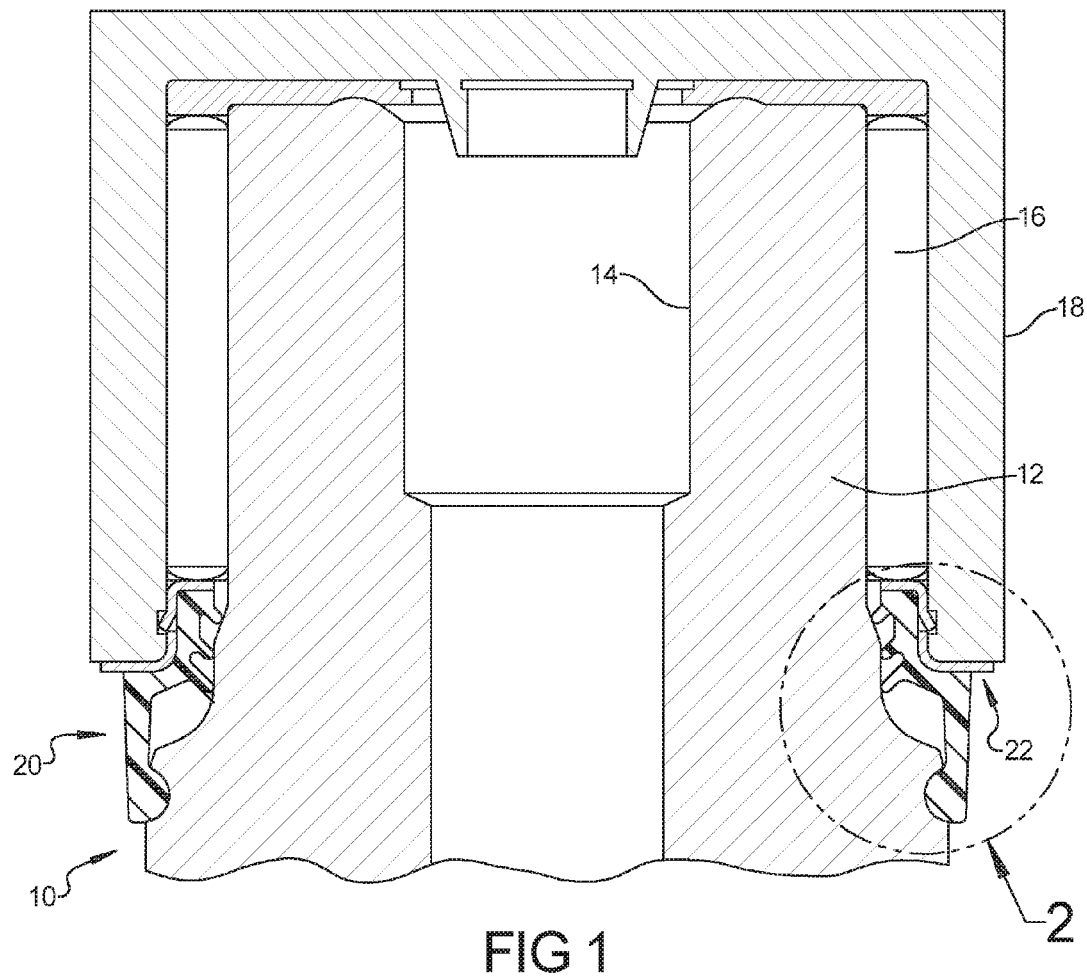
FIG. 1 is a cross sectional view of a portion of a trunnion including a bearing cup and a lip seal in accordance with the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a cross member 10 for a universal joint is shown in partial view including a trunnion 12 having a hollow central bore 14. A roller bearing assembly 16 surrounds the trunnion 12 and is disposed inside of a bearing cup 18. A universal joint seal 20 is provided between an open and 22 of the bearing cup 18 and the trunnion 12.

Figure 2:
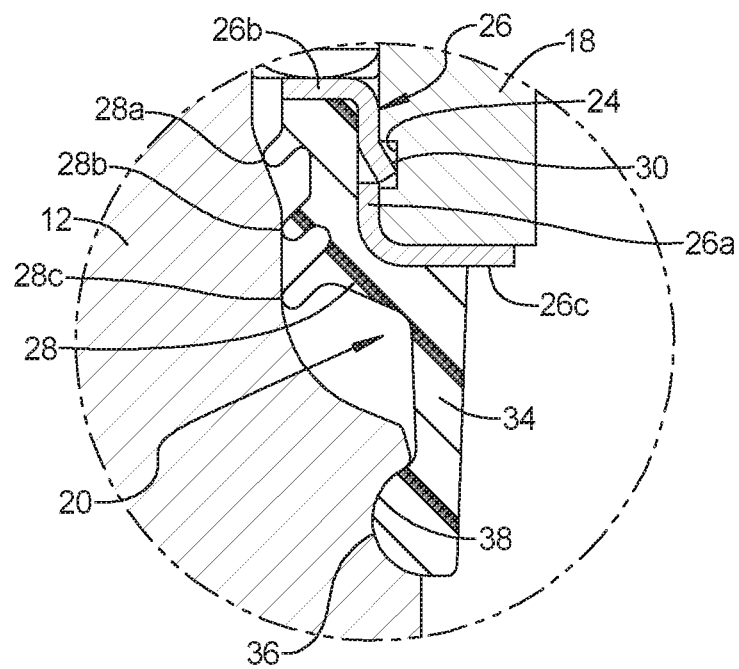
FIG. 2 is a further enlarged cross-sectional view of a portion of the trunnion, bearing cup, and lip seal illustrated in FIG. 1.
Figure 3:
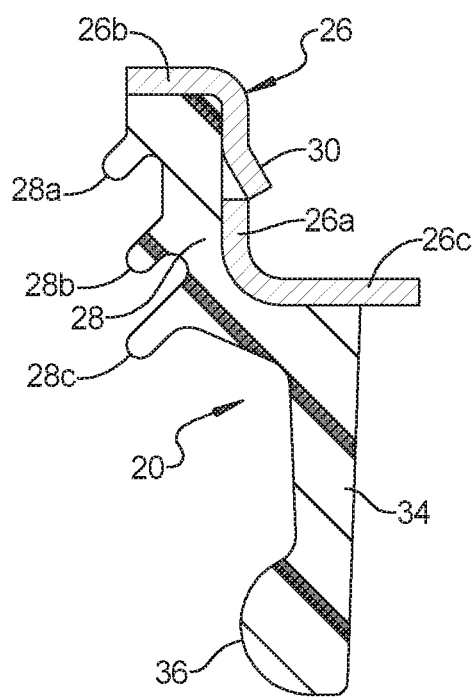
FIG. 3 is a sectional view similar to FIG. 2 illustrating the lip seal in accordance with the present disclosure.

With reference to FIG. 2, a detailed cross-sectional view of the interface region between the bearing cup 18, trunnion 12 and universal joint seal 20 will now be described in detail. The interior surface of the bearing cup 18 includes an annular retention recess 24 therein. The seal 20 includes a seal support insert 26 and an elastomeric seal 28 molded thereto. The seal support insert 26 can include a cylindrical portion 26a, an inwardly extending annular rim 26b and an outwardly extending annular rim 26c. The cylindrical portion 26a includes one or more outwardly protruding retention members 30 that engage the annular retention recess 24 on the interior surface of the bearing cup 18 for securing the seal 20 in connection with the open end 22 of the bearing cup 18. The elastomeric seal 28 can include a plurality of seal lips 28a-28c that extend radially inward therefrom. A dust lip 34 extends axially away from the seal support insert 26 and includes a dust lip retention feature 36 extending radially inward therefrom that is adapted to be in snap fit engagement with an annular recess 38 in an outer surface of the trunnion 12.

During assembly of the cross member 10, the seal 20 can be assembled to the bearing cup 18 prior to assembly on the trunnion 12. Retention member 30 retains the seal member 20 within the open end 22 of the bearing cup 18 during handling of the bearing cup 18 and seal 20. The seal 20 can also retain the roller bearing assembly 16 within the bearing cup 18. Once the bearing cup 18 is inserted over top of the trunnion 12, the dust lip retention feature 36 can be brought into snap fit engagement with the annular recess 38 in the outer surface of the trunnion 12.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A universal joint, comprising:
    a trunnion;
    a bearing cup disposed on the trunnion and including an inner diameter surface having a retention recess therein;
    a needle bearing assembly disposed between an outer surface of the trunnion and the inner diameter surface of the bearing cup; and
    a seal assembly disposed at an open end of the bearing cup and including a seal support insert including a radially outwardly protruding retention member engaged with the retention recess of the bearing cup, and an elastomeric seal engaged with the seal support insert and including a plurality of radially inwardly extending seal lips engaging the outer surface of the trunnion, wherein the elastomeric seal of the seal assembly includes an integrally formed dust lip extending axially from the seal support insert and including an annular radially inwardly protruding dust lip retention feature received in an annular recess of the trunnion.

2. The universal joint according to claim 1, wherein the seal support insert includes a cylindrical portion that includes the radially outwardly protruding retention member and an outwardly extending annular rim that engages an end surface of the open end of the bearing cup.

3. The universal joint according to claim 2, wherein the seal support insert further includes a radially inwardly extending annular rim that engages an end of the elastomeric seal.

4. A universal joint, comprising:
    a trunnion including an annular recess therein;
    a bearing cup disposed on the trunnion;
    a needle bearing assembly disposed between an outer surface of the trunnion and the inner diameter surface of the bearing cup; and
    a seal assembly disposed at an open end of the bearing cup and including an elastomeric seal engaged with a seal support insert and including a plurality of radially inwardly extending seal lips engaging the outer surface of the trunnion and including an integrally formed dust lip extending axially from the seal support insert and including a radially inwardly extending annular dust lip retention feature received in the annular recess of the trunnion.

5. The universal joint according to claim 4, wherein the seal support insert includes a cylindrical portion that includes a radially outwardly protruding retention member and an outwardly extending annular rim that engages an end surface of an open end of the bearing cup.

6. The universal joint according to claim 5, wherein the seal support insert further includes a radially inwardly extending annular rim that engages an end of the elastomeric seal.

7. A universal joint, comprising:
    a trunnion including an annular recess therein;
    a bearing cup disposed on the trunnion and including an inner diameter surface having a retention recess therein;
    a needle bearing assembly disposed between an outer surface of the trunnion and the inner diameter surface of the bearing cup; and
    a seal assembly disposed at an open end of the bearing cup and including a seal support insert including a radially outwardly protruding retention member engaged with the retention recess of the bearing cup, and an elastomeric seal engaged with the seal support insert and including a plurality of radially inwardly extending seal lips engaging the outer surface of the trunnion and an integrally formed dust lip extending axially from the seal support insert and including a radially inwardly extending annular dust lip retention feature received in the annular recess of the trunnion.

8. The universal joint according to claim 7, wherein the seal support insert includes a cylindrical portion that includes the radially outwardly protruding retention member and an outwardly extending annular rim that engages an end surface of an open end of the bearing cup.

9. The universal joint according to claim 8, wherein the seal support insert further includes a radially inwardly extending annular rim that engages an end of the elastomeric seal.

* * * * *